United States Patent [19]
Chupp

[11] 3,764,695
[45] Oct. 9, 1973

[54] INSECTICIDAL COMPOUNDS AND METHODS OF COMBATTING INSECTS USING PHENYL-N-(1-ALKENYL)-METHYLCARBAMATES

[75] Inventor: John Paul Chupp, Kirkwood, Mo.
[73] Assignee: Monsanto Company, St. Louis, Mo.
[22] Filed: Mar. 16, 1970
[21] Appl. No.: 20,044

[52] U.S. Cl. .................. 424/300, 260/468, 260/479
[51] Int. Cl. .............................................. A01n 9/20
[58] Field of Search ................ 424/300; 260/468 C, 260/479 C

[56] References Cited
UNITED STATES PATENTS
3,131,215   4/1964   Lemin .................................. 260/479
FOREIGN PATENTS OR APPLICATIONS
G152,501   10/1956   Germany ........................... 260/479

*Primary Examiner*—Jerome D. Goldberg
*Assistant Examiner*—Allen J. Robinson
*Attorney*—Paul C. Krizov, Neal E. Willis and John J. Henschke, Jr.

[57] ABSTRACT

Phenyl-N-(1-alkenyl)-N-methylcarbamates and their use as insecticides.

10 Claims, No Drawings

INSECTICIDAL COMPOUND AND METHOD OF COMBATTING INSECTS USING PHENYL-N-(1-ALKENYL)-METHYLCARBAMATES

This invention relates to new and novel phenyl-N-(1-alkenyl)-N-methylcarbamates, which are useful as biocides and particularly as insecticides. This invention also relates to insecticidal compositions and to methods of combatting insects.

The novel phenyl-N-(1-alkenyl)-N-methylcarbamates can be represented by the formula

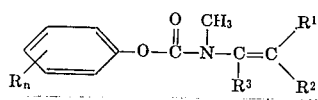

wherein R is alkyl or alkylamino of a maximum of six carbon atoms, $R^1$, $R^2$ and $R^3$ are hydrogen or alkyl of a maximum of four carbon atoms, $R^2$ and $R^3$ can together form an alkylene group of three through six carbon atoms, and n is an integer from 0 through 2.

The term alkenyl as used herein encompasses acyclic as well as cyclic alkenyl groups. When both $R^2$ and $R^3$ in the above formula are hydrogen or alkyl, the compounds are acyclic. When $R^2$ and $R^3$ are combined, however, to form an alkylene group, the alkylene group together with the ethylene linkage combines to form a cycloalkenyl group having from five through eight carbon atoms.

In the above formula, the alkyl groups of R, $R^1$, $R^2$ and $R^3$ can be methyl, ethyl, n-propyl, secondary propyl, isopropyl, n-butyl, secondary butyl, tertiary butyl, isobutyl and the various forms of pentyl and hexyl, and $R^2$ and $R^3$ taken together can form the corresponding alkylene groups.

The N-acyclic alkenyl compounds of the present invention are readily prepared by reacting a carbamoylchloride with a phenol or a phenoxide of an alkali metal (e.g., sodium, potassium, or ammonium) in accordance with the following general equation:

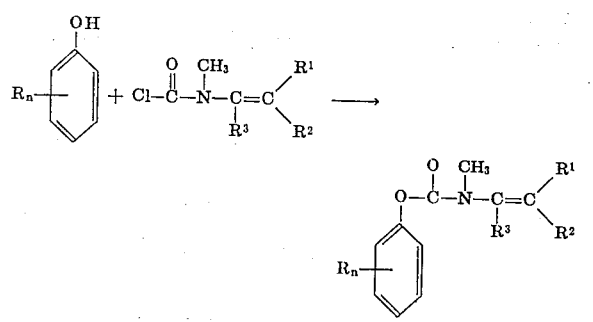

in which R, $R^1$, $R^2$, $R^3$ and n have the above identified significance. The reaction is normally conducted in an inert solvent such as diethyl ether at room temperature and goes to substantial completion in about 15 to 20 hours. The speed of the reaction can, of course, be materially increased at elevated temperatures. The temperature employed is not critical, and usually varies between room temperature and the boiling point of the particular solvent used. The carbamoylchloride employed in the above reaction can be prepared by the following methods. When preparing the phenyl-N-acyclic-alkenyl-N-methylcarbamates of the invention, an aldehyde is reacted with methyl amine and the product thereof treated with phosgene in accordance with the following general equation:

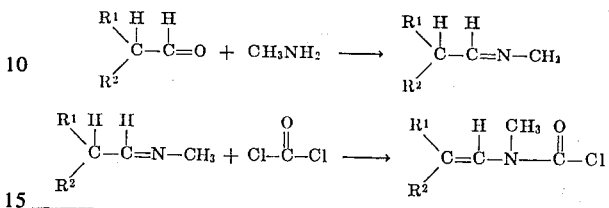

The carbamoylchlorides utilized in preparing the phenyl-N-cyclo-alkenyl-N-methylcarbamates of this invention can be prepared by reacting an N-methyl-N-cycloalkylidine with phosgene as exemplified by the following reaction:

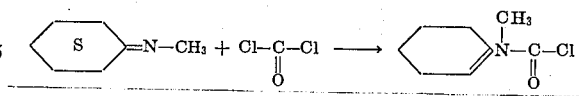

Alternately, the N-cycloalkenyl compounds of this invention are prepared by the reaction of a suitably substituted phenyl chloroformate with an N-methyl-N-cycloalkylidine.

The following examples will further illustrate the invention. In these examples, and throughout the specification, parts and percents are by weight unless otherwise indicated.

EXAMPLE 1

About 120 grams of m-isopropylphenol and about 1,500 ml. of dimethyl ether were charged into a suitable reaction vessel provided with an agitator, thermometer, and reflux means. After the addition of the phenol was complete, about 182 grams of a 25 percent solution of sodium methoxide was added dropwise with agitation. This resulted in the formation of the corresponding sodium phenoxide, and the methanol was distilled off. The reaction mixture was cooled to about room temperature, and about 155 grams of N-(2-ethyl-1-butenyl)N-methylcarbamoylchloride was added. The reaction mixture was then refluxed for about 2 hours and permitted to remain at room temperature for about 72 hours. The salt was filtered off and the filtrate taken up in methylene chloride, washed with an aqueous sodium carbonate solution, and then washed twice with water. The filtrate was dried over magnesium sulfate which was subsequently removed by filtration. The solvent was then stripped by evaporation, leaving a viscous oil which was identified as m-isopropylphenyl-N-(2-ethyl-1-butenyl)-N-methylcarbamate. This product gave the following analysis: Calc'd for: $C_{17}H_{25}O_2N$. Theory — 74.14 percent C, 9.15 percent H, 5.09 percent N. Found — 73.33 percent C, 9.02 percent H, 4.04 percent N.

EXAMPLE 2

About 12 grams of m-tolylchloroformate dissolved in about 100 ml. of benzene were added to a reaction vessel as described in the preceding example. Then about 8.5 grams of N-methyl-N-cyclohexylidene dissolved in about 50 mm. of benzene were added and the temperature of the reaction mixture maintained between about 0° and 5°C. The mixture was stirred for a period of about 5 minutes and then about 7.8 grams of triethylamine was added and the mixture heated at reflux for about 45 minutes. The mixture was cooled, filtered, and the filtrate washed with water, dried and the benzene removed under vacuum. The product thus obtained, m-tolyl-N-(cyclohexan-1-yl)-N-methylcarbamate, was analyzed for $C_{15}H_{15}O_2N$, with the following results: Theory — 77.4 percent C, 8.16 percent H, 6.0 percent N. Found — 75.52 percent C, 8.10 percent H, 5.48 percent N.

Other compounds made in general accordance with the procedures of the above examples include:

m-(1-methylbutyl) phenyl-N-(1-isobuten-1-yl)-N-methylcarbamate m-(1-ethylpropyl) phenyl-N-(1-isobuten-1-yl)-N-methylcarbamate m-(2-ethylpropyl) phenyl-N-(2-ethyl-1-hexen-1-yl)-methylcarbamate m-(1-methylbutyl) phenyl-N-(2-ethyl-1-hexen-1-yl)methylcarbamate m-isopropylphenyl-N-(2-ethyl-1-buten-1-yl)-methylcarbamate phenyl-N-(2-ethyl-1-buten-1-yl)-methylcarbamate m-isopropylphenyl-N-(isobuten-1-yl)methylcarbamate m-methylaminophenyl-N-(1-isobuten-1-yl)methylcarbamate m-ethylaminophenyl-N-(1-isobuten-1-yl)methylcarbamate m-hexylphenyl-N-(1-cycloocten-1-yl)-N-methylcarbamate m-ethylphenyl-N-(1-cyclohepten-1-yl)-N-methylcarbamate m-tolyl-N-(1-cyclopenten-1-yl)-N-methylcarbamate m-dimethylamino-N-ethenyl-N-methylcarbamate The terms "insect" and "insecticide" are used herein in their broad common usage to include spiders, mites, ticks, and like pests which are not in the strict biological sense classed as insects. Thus, the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, millipedes, and wood lice.

The activity of these compounds against the corn rootworm is illustrated by the following:

To a growth pouch (diSPo Seed-Pak growth pouch, Catalogue No. B1220, of Scientific Products Division of American Hospital Supply Corporation, Evanston, Illinois) in an upright position is added 20 ml. of distilled water. Thereafter is added 0.1 ml. of an acetone solution of known concentration in percent by weight of a compound of this invention (for example an 0.1 ml. of an 0.1 percent by weight acetone solution of the compound provides a concentration of 5.0 ppm. thereof while 0.1 ml. of an 0.02 percent by weight acetone solution of the said compound provides a concentration of 1.0 ppm thereof). In the trough of the pouch formed by the paper wick thereof is placed two corn seeds (Zea mays, Hybrid U.S. 13) about one inch apart. Thereupon to the trough and between the seeds is added 8 to 12 ready-to-hatch eggs of the southern corn rootworm (*Diabrotica undecimpunctata howardi*), which eggs were washed (with distilled water) free of the soil in which they were incubated at room temperature for 21 days immediately prior to their placement in the trough. The socharged growth pouch is then placed in an upright position in an incubator maintained at 80°F and 70 percent relative humidity for 14 days. Immediately thereafter the growth pouches are removed and the extent of kill in percent of the particular species of corn rootworm larvae observed. At a concentration of 5 ppm., a 100 percent kill was observed with m-isopropylphenyl-N-isobutenyl-N-methylcarbamate and also with m-isopropylphenyl-N-(2-ethyl-1-butenyl)-N-methylcarbamate. When used at the same concentration, a mixture of m-(1-methylbutyl)phenyl-N-isobutenyl-N-methylcarbamate and m-(1-ethylpropyl)phenyl-N-isobutenyl-N-methylcarbamate gave a 60 percent kill.

To demonstrate the activity of the compounds of this invention against the western corn rootworm (*Diabrotica virgifera*), compounds were incorporated into separate portions of soil containing sections of corn roots. Each portion of the soil was then infested with 10-day old western corn root larvae and maintained at 25°C and 70 percent relative humidity for 48 hours. At concentrations of 6 ppm., 100 percent kills were obtained with (1) m-tolyl-N-(1-cyclohexen-1-yl)-N-methylcarbamate, (2) m-isopropylphenyl-N-(2-ethyl-1-buten-1-yl)-N-methylcarbamate, (3) m-tolyl-N-(1-cyclohexen-1-yl)-N-methylcarbamate, and (4) a mixture of m-(1-methylbutyl) phenyl-N-(1-isobuten-1-yl)-N-methylcarbamate and m-(1-ethylpropyl) phenyl-N-(1-isobuten-1-yl)-N-methylcarbamate.

The compounds of the present invention are also quite effective against the boll weevil (*Anthonomus grandis*) and the bollworm (*Heliothis zea*). For example, when cotton fields are sprayed at the rate of 10 pounds per acre with m-tolyl-N-(1-cyclohexen-1-yl)-N-methylcarbamate, a 60 percent kill of the boll weevil is obtained. The same compound, when applied to leaves of cotton plants at a concentration of only 0.05 percent, resulted in a 60 percent kill of the bollworm.

The present compounds are also effective against the yellow fever mosquito (*Aedes egypti*). For example, 100 percent kills were obtained in a standard life cycle test with 2 ppm. of a mixture of m-(1-methylbutyl)phenyl-N-(1-isobuten-1-yl)-N-methylcarbamate and m-(1-ethylpropyl)phenyl-N-(1-isobuten-1-yl)-N-methylcarbamate, 2 ppm. of a mixture of m-(2-ethylpropyl)phenyl-N-(2-ethyl-1-hexen-1-yl)-N-methylcarbamate and m-(1-methylbutyl)phenyl-N-(2-ethyl-1-hexen-1-yl)-N-methylcarbamate and 0.2 ppm. of m-isopropylphenyl-N-(2-ethyl-1-buten-1-yl)-N-methylcarbamate.

Although the compounds of this invention are useful per se in controlling a wide variety of insect pests, it is preferable that they be supplied to the pests or to the environment of the pests in a dispersed form in a suitable extending agent.

The term "dispersed" is used herein in its widest possible sense. When it is said that the compounds of this invention are dispersed, it means that particles of the compounds may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the compounds of this invention in a carrier such as dichlorodifluoromethane and the like fluorochloroalkanes which boil below room temperature at atmospheric pressure.

The expression "extending agent" as used herein includes insecticidal adjuvants and any and all of the substances in which the compounds of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powders.

The exact concentration of the compounds of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 50 percent by weight. When the extending agent is a semi-solid or solid, the concentration of the compound employed to supply the desired dosage generally will be in the range of 0.1 to 80 percent by weight. From a practical point of view, the manufacturer must supply the user with a concentrate in such form that, by merely mixing with water of solid extender (e.g., powdered clay or talc) or other low-cost material available to the user at the point of use, he will have an easily prepared insecticidal spray or particulate solid. In such a concentrate composition, the compound generally will be present in a concentration of 5 to 95 percent by weight, the residue being any one or more of the well-known insecticidal adjuvants, such as the various surface active agents (e.g., detergents, a soap or other emulsifying or wetting agent), surface-active clays, solvents, diluents, carrier media, adhesives, spreading agents, humectants, and the like.

The compounds of this invention are preferably supplied to the insect pests or to the environment of the insect pests in the form of emulsions or suspensions. Emulsions or suspensions are prepared by dispersing the compounds either per se or in the form of an organic solution thereof in water with the aid of a water-soluble surfactant. The term "surfactant" as employed herein is used as in volume II of Schwartz, Perry and Berch's "Surface Active Agents and Detergents" (1958, Interscience Publishers Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). These surfactants include the well-known capillary-active substances which may be anionic, cationic, or non-ionic which are described in detail in volumes I and II of Schwartz, Perry and Berch's "Surface Active Agents and Detergents" (1958, Interscience Publishers, Inc., N.Y.) and also in the November, 1947 issue of Chemical Industries (pages 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water-soluble anionic non-ionic surface-active agents set forth in U.S. Pat. No. 2,846,398 (issued Aug. 5, 1958). In general, a mixture of water-soluble anionic and water-soluble non-ionic surfactants is preferred.

The compounds of this invention can be dispersed by suitable methods (e.g., tumbling or grinding) in solid extending agents either of organic or inorganic nature and supplied to the insect pests' environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials as well as organic materials such as powdered cork, powdered wood, and powdered walnut shells. The preferred solid carriers are the adsorbent clays, e.g., bentonite. These mixtures can be used for insecticidal purposes in the dry form, or by addition of watersoluble surfactants or wetting agents, the dry particulate solids can be rendered wettable by water so as to obtain stable aqueous dispersions or suspensions suitable for use as sprays.

For special purpose the compounds of this invention can be dispersed in a semi-solid extending agent such as petroleum or soap (e.g., sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient phosphonate to make 100 parts by weight. Such a concentrate is particularly adapted to be made into a spray for combatting various forms of insect pests by the addition of water thereto.

Another useful concentrate adapted to be made into a spray for combatting a variety of insect pests is a solution (preferably as concentrated as possible) of a compound of this invention in an organic solvent therefor. The said liquid concentrate preferably contains dissolved therein a minor amount (e.g., 0.5 to 10 percent by weight of the weight of the new insecticidal agent) of a water-soluble surfactant (or emulsifying agent).

Emulsifiable concentrates of this general type are particularly well adapted for use as sheep and cattle dips in the control of animal parasites. In preparing such dips, a compound of this invention is dissolved in a water-immiscible solvent system and a sufficient quantity of one or more emulsifying agents is added to insure the formation of a stable aqueous emulsion. Water is then added to the concentrate to form an emulsion containing from about 0.01 percent to about 0.5 percent of the active ingredient.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

The compositions of this invention can also contain other additiments such as fertilizers and pesticides used as, or in combination with, the carrier materials. For example, the pesticides listed in U.S. Pat. No. 3,393,990 starting at line 68, column 7 and extending through line 71 of column 8, can be used in combination with the above described compounds.

In controlling or combatting insect pests the compounds of this invention either per se or compositions containing them are supplied to the insect pests or to their environment in a lethal or toxic amount. This can be done by dispersing the new insecticidal agent or insecticidal composition comprising same in, on or over an infested environment or in, on or over an environment the insect pests frequent, e.g., agricultural soil or other growth media or other media infested with insect pests or attractable to the pests for habitational or sustenance or propagational purposes, in any conventional fashion which permits contact between the insect pests and the compounds of this invention. Such dispersing can be brought about by applying sprays, dips or particulate solid compositions to a surface infested with the insect pests or attractable to the pests as for example, animals such as sheep and cattle, the surface of an agricultural soil or other media such as the above ground surface of plants by any of the conventional methods, e.g., power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish subsurface penetration and impregnation therein.

While this invention has been described with respect to certain embodiments, it is to be understood that it is not so limited and that variations and modifications thereof obvious to those skilled in the art can be made without departing from the spirit and scope thereof.

I claim:

1. A method of combatting insects which comprises contacting said insects with a toxic amount of m-isopropylphenyl-N-(1-isobuten-1-yl)-N-methylcarbamate.

2. A method of combatting insects which comprises contacting said insects with a toxic amount of m-methylphenyl-N-(1-cyclohexen-1-yl)-N-methylcarbamate.

3. A method of combatting insects which comprises contacting said insects with a toxic amount of m-pentylphenyl-N-(1-isobuten-1-yl)-N-methylcarbamate.

4. A method of combatting insects which comprises contacting said insects with a toxic amount of m-isopropylphenyl-N-(1-isopenten-1-yl)-N-methylcarbamate.

5. A method of combatting insects which comprises contacting said insects with a toxic amount of m-pentylphenyl-N-(2-ethyl-1-hexen-1-yl)-N-methylcarbamate.

6. An insecticidal composition comprising an insecticidal adjuvant, and as an active ingredient, a toxic amount of m-isopropylphenyl-N-(1-isobuten-1-yl)-N-methylcarbamate.

7. An insecticidal composition comprising an insecticidal adjuvant, and as an active ingredient, a toxic amount of m-methylphenyl-N-(1-cyclohexen-1-yl)-N-methylcarbamate.

8. An insecticidal composition comprising an insecticidal adjuvant, and as an active ingredient, a toxic amount of m-pentylphenyl-N-(1-isobuten-1-yl)-N-methylcarbamate.

9. An insecticidal composition comprising an insecticidal adjuvant, and as an active ingredient, a toxic amount of m-isopropylphenyl-N-(1-isopenten-1-yl)-N-methylcarbamate.

10. An insecticidal composition comprising an insecticidal adjuvant, and as an active ingredient, a toxic amount of m-pentylphenyl-N-(2-ethyl-1-hexen-1-yl)-N-methylcarbamate.

* * * * *